Patented July 12, 1938

2,123,250

UNITED STATES PATENT OFFICE 2,123,250

PROCESS FOR THE PRODUCTION OF DEPOLARIZING COMPOSITIONS FROM NATIVE MANGANESE DIOXIDE, E. G., PYROLUSITE

Wilhelm Müller and Gerhard Schaufler, Bitterfeld, Germany, assignors to I. G. Farbenindustrie Aktiengesellschaft, Frankfort - on - the - Main, Germany No Drawing. Application December 18, 1935, Serial No. 55,064. In Germany December 24, 1934

6 Claims. (Cl. 23—145)

This invention relates to a process for the production of depolarizing compositions from native manganese dioxide, e. g. pyrolusite.

Satisfactory depolarizing compositions for dry-battery cells are obtained according to known processes by employing manganese hydroxides, such as are formed in oxidation reactions, for example in oxidizing toluene sulphonamide, or toluene, to benzoic acid with permanganate. Since the extent to which such hydroxides are available is far below the quantities required for the purpose in question, resorting to the treatment of native manganese dioxide or pyrolusite was indicated. The pure mineral, however, is very sluggish in reaction as a depolarizer and although the reactivity can be improved by roasting the mineral, or by roasting followed by extraction with acids, experiments have shown that this improvement is merely slight.

The present invention accordingly aims at securing better results by employing, in the production of dry-battery cells, depolarizing compositions having a substantially improved reactivity. According to the present invention such depolarizing compositions are obtained by first converting a portion only—preferably about 20–25%—of the $MnO_2$ contained in the native mineral into $Mn_2O_3$, by roasting, then dissolving the latter in dilute mineral acids, or acid salts in aqueous solution, and without separating the solution from the residue, thereupon effecting the precipitation of the dissolved manganese salts on to the remaining portion of the original manganese dioxide by means of alkalis, finally oxidizing the precipitated manganese hydroxide by the aid of manganates or permanganates. In this manner, products of far greater reactivity can be obtained, as will be evident from the comparative tests given below.

Mineral acids may also be replaced by organic acids—such as acetic acid—for dissolving the manganese sesquioxide. Moreover, the alkaline sludges, formed during the oxidation of organic substances with permanganate in alkaline solution, may be employed for precipitating the manganese hydroxides instead of the alkalis above referred to.

Example

Native manganese dioxide or pyrolusite, containing for example 90% of $MnO_2$, is roasted at about 650–680° C. for about 2 to 3 hours, about 20–25% of the original $MnO_2$ being thereby converted into $Mn_2O_3$. The roasted material, while still hot, is introduced into a quantity of dilute sulphuric acid exceeding the amount theoretically required for dissolving the $Mn_2O_3$ formed by about 30%. When practically the whole of the $Mn_2O_3$ is dissolved, the excess of acid is neutralized—without removal of the residue—by the addition of alkali, whereby the manganese salt in solution is thrown down as hydroxide, which latter is then oxidized to the oxidation level of manganese dioxide with the aid of potassium permanganate.

The results of comparative tests are as follows:

It was found that the pure mineral dioxide furnishes a lighting current for only 4½ hours in a salammoniac cell. If only 10% of the mineral treated in accordance with the present invention, be added to the raw mineral, the cell furnishes lighting current for at least 6 hours, whilst, with an addition of 30%, the period is increased to 6¾ to 7 hours. Moreover, the discharge voltage is higher, so that a substantially increased yield of current is obtained by the addition of the thus treated mineral.

We claim:

1. A process for the production of depolarizing compositions from native manganese dioxide which comprises roasting said native manganese dioxide so as to convert a minor portion into $Mn_2O_3$, dissolving said $Mn_2O_3$ by means of a solution of at least one acid reacting compound capable of dissolving $Mn_2O_3$ and in concentration so adjusted as to cause solution of $Mn_2O_3$ but not of $MnO_2$, precipitating the dissolved manganese salts onto the remaining portion of the original native manganese dioxide by the addition of an alkaline agent, and thereupon oxidizing the precipitated manganese hydroxide to manganese dioxide by means of oxidizing agents.

2. A process for the production of depolarizing compositions from native manganese dioxide which comprises roasting said native manganese dioxide so as to convert from about 20 to about 25% thereof into $Mn_2O_3$, dissolving said $Mn_2O_3$ by means of a solution of at least one acid reacting compound capable of dissolving $Mn_2O_3$ and in concentration so adjusted as to cause solution of $Mn_2O_3$ but not $MnO_2$, precipitating the dissolved manganese salts on to the remaining portion of the original native manganese dioxide by the addition of an alkaline agent, and thereupon oxidizing the precipitated manganese hydroxide to manganese dioxide by means of oxidizing agents.

3. A process for the production of depolarizing compositions from native manganese dioxide which comprises roasting said native manganese dioxide so as to convert from about 20 to about 25% thereof into $Mn_2O_3$, dissolving said $Mn_2O_3$ by means of an inorganic acid sufficiently dilute to dissolve $Mn_2O_3$ but not $MnO_2$, precipitating the dissolved manganese salts on to the remaining portion of the original native manganese dioxide by the addition of alkaline sludges formed in the process of oxidizing organic substances with potassium permanganate in alkaline solution and thereupon oxidizing the precipitated manganese hydroxide to manganese dioxide by means of oxidizing agents.

4. A process for the production of depolarizing compositions from native manganese dioxide which comprises roasting said native manganese dioxide so as to convert from about 20 to about 25% thereof into $Mn_2O_3$, extracting said $Mn_2O_3$ by means of an inorganic acid sufficiently dilute to dissolve $Mn_2O_3$ but not $MnO_2$ precipitating the dissolved manganese salts on to the remaining portion of the original native manganese dioxide by the addition of an alkaline agent, and thereupon oxidizing the resulting manganese hydroxide to manganese dioxide with potassium permanganate.

5. A process for the production of depolarizing compositions from native manganese dioxide which comprises roasting said native manganese dioxide so as to convert from about 20 to about 25% thereof into $Mn_2O_3$, extracting said $Mn_2O_3$ by means of sulphuric acid of a concentration so adjusted as to cause solution of $Mn_2O_3$ but not of $MnO_2$ precipitating the dissolved manganese salts on to the remaining portion of the original native manganese dioxide by means of alkali and thereupon oxidizing the resulting manganese hydroxide to manganese dioxide with potassium permanganate.

6. A process for the production of depolarizing compositions from native manganese dioxide which comprises roasting said native manganese dioxide so as to convert from about 20 to about 25% thereof into $Mn_2O_3$, extracting said $Mn_2O_3$ by means of sulphuric acid of a concentration so adjusted as to cause solution of $Mn_2O_3$ but not of $MnO_2$ precipitating the dissolved manganese salts on to the remaining portion of the original native manganese dioxide by the addition of alkaline sludges formed in the process of oxidizing organic substances with potassium permanganate and thereupon oxidizing the resulting manganese hydroxide to manganese dioxide with potassium permanganate.

WILHELM MÜLLER.
GERHARD SCHAUFLER.